March 12, 1963 E. A. PASCHAL 3,081,441

VOLTAGE DIVIDER

Filed March 8, 1961 2 Sheets-Sheet 1

INVENTOR.
EDWIN A. PASCHAL,
BY Robert H. Himes
ATTORNEY.

March 12, 1963 E. A. PASCHAL 3,081,441

VOLTAGE DIVIDER

Filed March 8, 1961 2 Sheets-Sheet 2

INVENTOR.
EDWIN A. PASCHAL,
BY
Robert H. Hines
ATTORNEY

United States Patent Office 3,081,441
Patented Mar. 12, 1963

3,081,441
VOLTAGE DIVIDER

Edwin A. Paschal, Anaheim, Calif., assignor to Hughes Aircraft Company, Culver City, Calif., a corporation of Delaware

Filed Mar. 8, 1961, Ser. No. 94,394
9 Claims. (Cl. 333—81)

Figure 1:
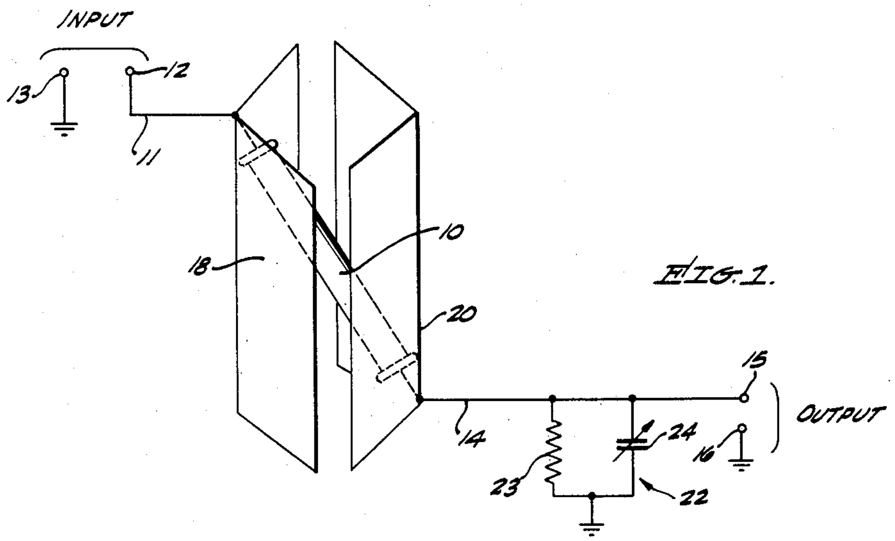

This invention relates to an apparatus for providing a high-voltage divider or attenuator and more particularly to a voltage divider which occupies minimum volume and which has a flat frequency response characteristic.

One technique currently employed to produce a voltage division which changes very little with frequency is to connect first and second parallel resistor-capacitor combinations having equal time constants in series across the voltage supply. When the divider is to be a high impedance device, as is frequently the case, the effects of stray capacitance become quite important. In this latter case, the input capacitor is made sufficiently large to "swamp" the stray capacitance and the remaining capacitor is adjusted to equalize the time constants. On the other hand, to minimize error caused by misadjustment, the capacitances should be as small as possible which decreases the amount of stray capacitance that can be swamped out. Thus, in order to minimize stray capacitance and avoid coupling undesired signals therethrough, valuable space is often spent providing geometric isolation of the network, i.e., in minimizing the stray capacitance. In addition, the resistors of the respective parallel combinations must be isolated from each other in that the foregoing technique cannot compensate for stray capacitance to various portions of the resistor bodies.

Lastly, if high voltage is involved, application of the foregoing technique becomes difficult in that it becomes necessary to employ large high-voltage resistors and capacitors with their concommitant stray capacitances. An alternative structure is to use several smaller resistors in series to share the voltage in which case a small capacitor is connected in parallel with each resistor. For each resistor that is added, a new parallel resistor-capacitor combination is added which must be held to the same time constant as the other combinations. The design, alignment, reproducibility, reliability and packaging of the presently available networks are difficult particularly if the specifications require high voltage together with large bandwidth and high impedance.

It is therefore an object of the present invention to provide an improved high voltage wide bandwidth voltage divider.

Another object of the present invention is to provide a voltage divider incorporating a high voltage resistor wherein displacement current is added at every point therealong at the same rate that it is removed.

Still another object of the present invention is to provide a high-voltage frequency flat voltage divider adaptable to being packaged in a comparative small volume.

In accordance with the present invention, displacement current is added to and removed from a high-voltage voltage-dividing resistor by means of capacitive shields provided by first and second conductive plates which are connected to opposite extremities of the resistor and which are disposed concurrently along the resistor with progressively increased spacing commencing from the points at which the respective first and second conductive plates are connected to the resistor. Secondly, the first and second conductive plates may, in turn, be surrounded by an additional conductive sheet or plate which is referenced to ground. Lastly, one extremity of the high-voltage resistor is connected to a parallel resistor-capacitor combination which is referenced to ground and possesses a time constant substantially equal to that of the high-voltage resistor with its associated shields. In this respect, the degree to which the device has a flat frequency response will depend largely on the accuracy with which the time constant of the parallel resistor-capacitor network equals that of the high-voltage resistor with its associated shields. The input to the device is at the remaining extremity of the high-voltage resistor and the low-voltage output is at the junction of the high-voltage resistor and the parallel resistor-capacitor combination.

Figure 2:
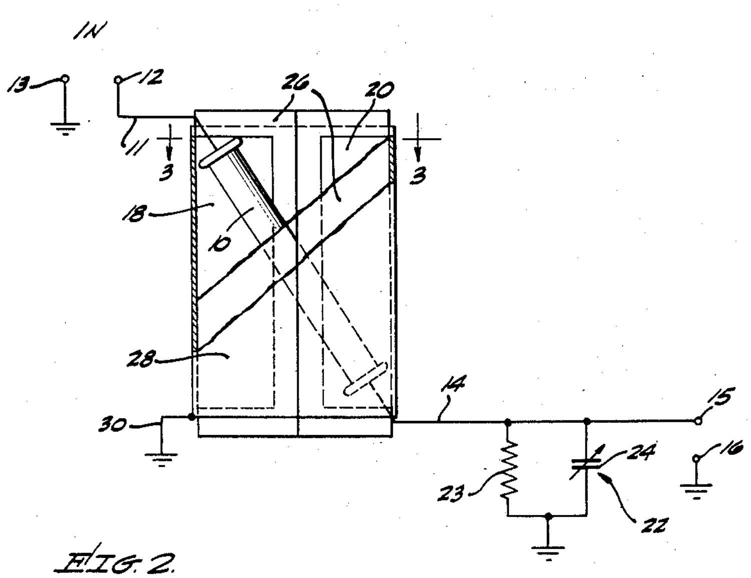
Figure 3:
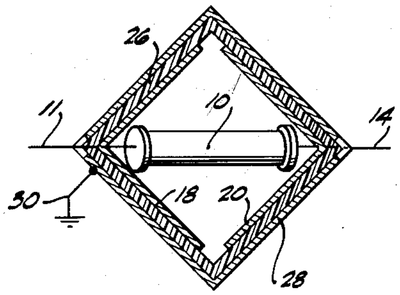
Figure 5:
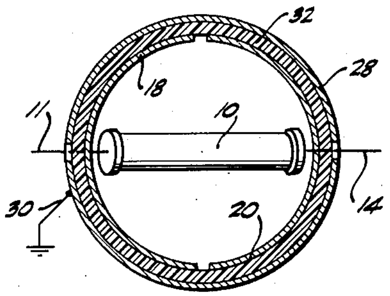
Figure 4:
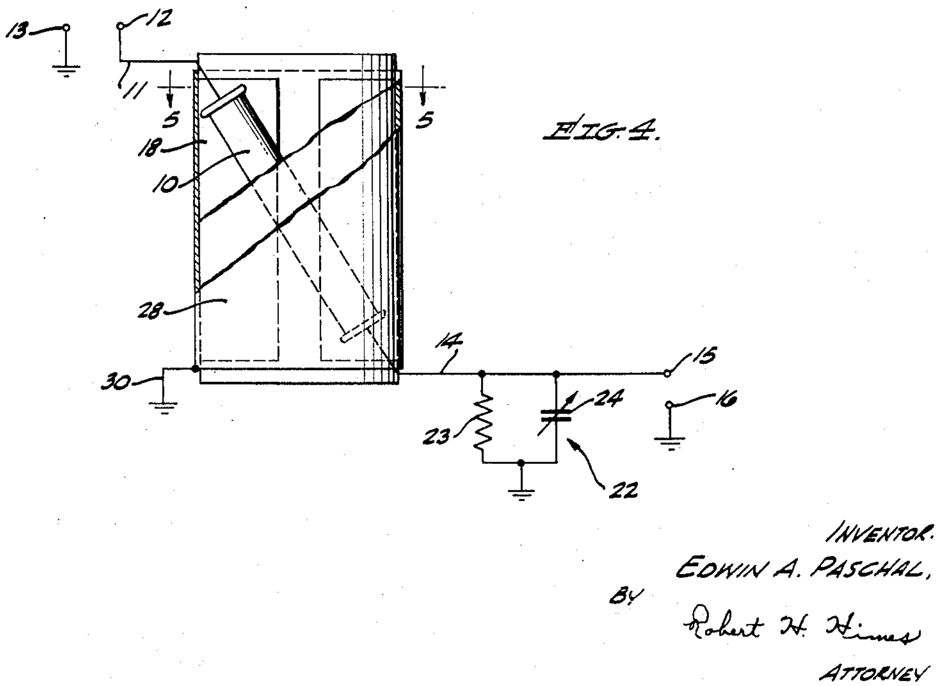

The above-mentioned and other features and objects of this invention and the manner of obtaining them will become more apparent by reference to the following description taken in conjunction with the accompanying drawings, wherein:

FIG. 1 shows a view in perspective of the basic device of the present invention;

FIGS. 2 and 3 show a partial cutaway plan and a top view, respectively, of the device of FIG. 1 with additional shielding to ground; and FIGS. 4 and 5 show a circular configuration of plan and top views, respectively, of the device illustrated in FIGS. 2 and 3.

Referring now to FIG. 1 of the drawings, the basic device of the present invention comprises a high-voltage resistor 10 having a lead 11 connected to the high-side of input terminals 12, 13 and a lead 14 connected to the high-side of output terminals 15, 16. The remaining input terminal 13 and the remaining output terminal 16 are connected to ground. Resistor 10 is preferably a single long resistor although a number of smaller resistors may be used so long as the length of the respective bodies of the resistors is long compared to the length of the interconnecting leads. Shields 18 and 20 are provided by conductive sheets having L-shaped cross-sections and which have a corner portion at one extremity thereof connected to the leads 11, 14, respectively, adjacent the extremities of the body of resistor 10. The shields 18, 20 are disposed coextensively and parallel with each other in such a manner that the body of the resistor 10 departs linearly from the shield 18 and approaches the shield 20 linearly in proceeding from the connection on shield 18 to the connection on shield 20. As specified above, shields 18 and 20 are L-shaped in cross-section, whereby a cross-sectional view of both the shields 18 and 20 constitutes a square with two gaps. Shields 18, 20 may be fabricated from sheet metal such as aluminum or foil or other conductive material disposed on an open-ended square cylinder of dielectric material. Lastly, the output lead 14 of resistor 10 which is connected to output terminal 15 is also connected to one extremity of a parallel impedance combination 22, the remaining extremity of which is connected to grround. Parallel impedance combination 22 includes a resistor 23 and a variable capacitor 24 connected in parallel. In instances where the resistance of resistor 23 approaches even 50% of the resistance of resistor 10, the variable capacitor 24 may assume the same form as the shields 18, 20. In operation, the time constant of the parallel combination 22 is adjusted to be equal to that of the resistor 10 together with the shields 18, 20.

Referring to FIGS. 2 and 3, there is shown an embodiment of the device of FIG. 1 wherein the shields 18, 20 are surrounded with an additional shield which is referenced to ground. In particular, the shields 18, 20 are disposed in opposite corners of an open-ended square dielectric cylinder 26. In addition, a layer 28 of conductive material is disposed on the outer surface of the square dielectric cylinder 26 coextensive with the body of resistor 10 and referenced to ground over a lead 30.

Referring to FIGS. 4 and 5, there is shown an alternate embodiment of the device of FIGS. 2 and 3 that is particularly adaptable for use as a high-voltage probe. In particular, in the embodiment of FIGS. 4 and 5 the open-ended square dielectric cylinder 26 is replaced with an open-ended circular dielectric cylinder 32 and the shields 18, 20, 28 are made to conform accordingly. The outer shield 28 may, of course, completely enclose the resistor 10 together with the capacitive shields 18, 20 if desired.

In the operation of the device of the present invention, the voltage drop across the body portion of resistor 10 is assumed to be substantially uniform. Under these circumstances, the voltage difference from the resistor 10 to the shield 18 progressively increases and the voltage difference from shield 20 to the resistor 10 progressively decreases in proceeding along the body of resistor 10 from input lead 11 to output lead 14. On the other hand, the distance from the shields 18, 20 to the body of resistor 10 progressively increases in proceeding away from their respective points of contact. Thus, in proceeding along the body of resistor 10, the displacement current leaving therefrom remains substantially equal to the displacement current arriving, i.e., the net displacement current to and from the body of resistor 10 along the entire length thereof remains substantially zero. This effect is primarily responsible for the flat frequency response of the device.

Although the invention has been shown in connection with a certain specific embodiment, it will be readily apparent to those skilled in the art that various changes in form and arrangement of parts may be made to suit requirements without departing from the spirit and scope of the invention.

I claim:

1. A voltage divider apparatus comprising an input terminal and an output terminal; a resistor having an elongated body portion connected from said input terminal to said output terminal; a first electrical shield having one portion thereof disposed adjacent to one extremity of said body portion and electrically connected to said input terminal, the intervening distance between said body portion and said first shield being progressively greater in proceeding away from said one extremity and along said body portion; a second electrical shield having one portion thereof disposed adjacent to the remaining extremity of said body portion and electrically connected to said output terminal, the intervening distance between said body portion and said second shield being progressively greater in proceeding away from said remaining extremity and along said body portion, said resistor and said first and second electrical shields having a predetermined time constant; and a parallel resistor-capacitor combination connected from said output terminal to a junction maintained at a substantially fixed reference potential, said parallel resistor-capacitor combination having a time-constant that is substantially equal to said predetermined time-constant.

2. The voltage divider apparatus as defined in claim 1 including additional means referenced to a substantially fixed reference potential for shielding said first and second electrical shields.

3. The voltage divider apparatus as defined in claim 1 wherein said first and second electrical shields have L-shaped cross-sections and are disposed parallel to each other.

4. The voltage divider apparatus as defined in claim 1 wherein said first and second electrical shields have arcuate cross-sections and are disposed parallel to each other.

5. A voltage divider apparatus comprising a rectangular dielectric cylinder; a resistor having first and second leads and an elongated body portion disposed along a major diagonal of said rectangular dielectric cylinder whereby a center line through said elongated body portion and first and second opposite corners of said rectangular dielectric cylinder are in a common plane; a first conductive layer disposed on the inner surface of said rectangular dielectric cylinder along said first corner coextensive with said elongated body portion and connected to said first lead; a second conductive layer disposed on the inner surface of said rectangular dielectric cylinder along said second corner coextensive with said elongated body portion and connected to said second lead; and a parallel resistor-capacitor combination connected from said second lead to a junction maintained at a substantially fixed reference potential whereby a predetermined portion of a voltage applied to said first lead appears at said second lead.

6. A voltage divider apparatus as defined in claim 5 which additionally includes a third conductive layer disposed on portions of the outer surface of said rectangular dielectric cylinder coextensive with said first and second conductive layers and means for maintaining said third conductive layer at a substantially fixed reference potential.

7. A voltage divider apparatus comprising a circular dielectric cylinder; first and second conductive layers disposed lengthwise along the inner surface of said cylinder on opposite sides thereof; a resistor having first and second leads and an elongated body portion disposed along a diagonal of said cylinder from said first conductive layer to said second conductive layer, said first lead being in electrical contact with said first conductive layer and said second lead being in electrical contact with said second conductive layer; and a parallel resistor-capacitor combination connected from said second lead to a junction maintained at a substantially fixed reference potential whereby a predetermined portion of a voltage applied to said first lead appears at said second lead.

8. The voltage divider apparatus as defined in claim 7 which additionally includes a third conductive layer disposed on the outer surface of said circular dielectric cylinder, and means for maintaining said third conductive cylinder at a substantially fixed reference potential.

9. In an electrical apparatus an impedance element comprising a resistor having an elongated body portion and first and second leads; a first electrical shield having one portion thereof disposed adjacent to one extremity of said body portion and electrically connected to said first lead, the intervening distance between said body portion and said first shield being progressively greater in proceeding away from said one extremity and along said body portion; and a second electrical shield having one portion thereof disposed adjacent to the remaining extremity of said body portion and electrically connected to said second lead, the intervening distance between said body portion and said second shield being progressively greater in proceeding away from said remaining extremity and along said body portion.

References Cited in the file of this patent

UNITED STATES PATENTS

| | | |
|---|---|---|
| 2,615,091 | Keitley | Oct. 21, 1952 |
| 2,685,673 | Avins | Aug. 3, 1954 |
| 2,884,597 | Miller | Apr. 28, 1959 |
| 2,894,205 | Schrock | July 7, 1959 |